United States Patent [19]
Riley

[11] Patent Number: 5,673,900
[45] Date of Patent: Oct. 7, 1997

[54] RECLAMATION OF METAL FROM SCRAP

[75] Inventor: Eric Keith Riley, Wolverhampton, Great Britain

[73] Assignee: Benjamin Priest Limited, West Midland, Great Britain

[21] Appl. No.: 377,506

[22] PCT Filed: Jun. 7, 1991

[86] PCT No.: PCT/GB91/00911

§ 371 Date: Jan. 4, 1993

§ 102(e) Date: Jan. 4, 1993

[87] PCT Pub. No.: WO92/01074

PCT Pub. Date: Jan. 23, 1992

Related U.S. Application Data

[63] Continuation of Ser. No. 961,911, Jan. 4, 1993, abandoned.

[30] Foreign Application Priority Data

Jul. 6, 1990 [GB] United Kingdom .................. 9015007

[51] Int. Cl.$^6$ .................. C22B 7/00; C21B 13/00
[52] U.S. Cl. .................. 266/44; 266/144; 266/79; 266/901
[58] Field of Search .................. 266/44, 144, 901, 266/158, 156, 79

[56] References Cited

U.S. PATENT DOCUMENTS

| | | | |
|---|---|---|---|
| 3,869,112 | 3/1975 | Habayeb | 266/200 |
| 4,055,334 | 10/1977 | Stephens | 266/156 |
| 4,060,408 | 11/1977 | Kuhn | 75/68 R |
| 4,319,921 | 3/1982 | Pryor et al. | 266/156 |
| 4,394,166 | 7/1983 | Kennedy | 75/65 R |
| 4,402,738 | 9/1983 | Akio | 75/65 R |
| 4,548,651 | 10/1985 | Ramsey | 266/901 |
| 4,601,750 | 7/1986 | Robak et al. | 75/65 R |

FOREIGN PATENT DOCUMENTS

A0050795 5/1982 European Pat. Off. .

*Primary Examiner*—Scott Kastler
*Attorney, Agent, or Firm*—St. Onge Steward Johnston & Reens LLC

[57] ABSTRACT

A process for recovering metal from scrap using a furnace having a bath chamber, a dry hearth chamber, an exhaust duct, and an incinerator for burning fumes from the dry hearth chamber is presented. The process includes conveying oxygen or oxygen enriched air to the incinerator in order to produce a desired oxygen concentration within the incinerator; introducing at least a major portion of the gases leaving the incinerator into the bath chamber; venting a minor portion of the gases from the bath chamber through the exhaust duct; and passing at least a major portion of the balance of the gases through the dry hearth chamber and recycling the balance of the gases to the incinerator, and wherein the concentration of oxygen present in one of the furnace and a duct which conveys hot combustion gases from the incinerator to the furnace is determined, and the volume of oxygen admitted to the incinerator is controlled in order to maintain the desired oxygen concentration within the incinerator.

15 Claims, 4 Drawing Sheets

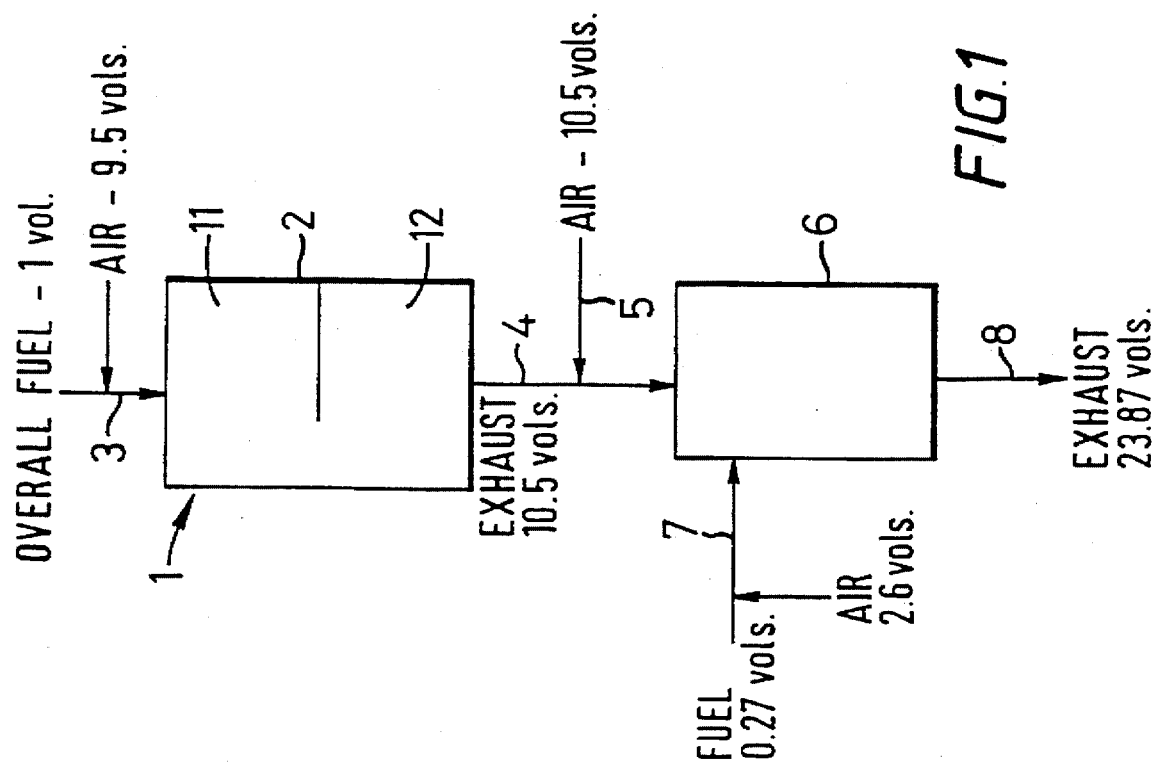

5,673,900

RECLAMATION OF METAL FROM SCRAP

This is a continuation of application Ser. No. 07/961,911 filed on Jan. 4, 1993, now abandoned.

This invention relates to the reclamation of metal from scrap.

It is becoming increasingly common to reclaim metal from scrap, for example copper from copper wire, steel from tires and aluminium from aluminium cans and containers.

Typically, the scrap is heated in a furnace to vaporise and/or partially combust the unwanted material leaving the required metal which is melted and flows to the bottom of the furnace. The vaporised and partially combusted material typically comprises acrid black fumes derived from plastic, oil, paint and grease on the metal which are then passed to an incinerator where they are burnt to convert most of the hydrocarbons to carbon dioxide and water vapour. The gas is then filtered to remove particulate material and/or scrubbed and vented to atmosphere together with some residual pollutants.

Over recent years the permissible levels of pollutants which can be released to the atmosphere has been reduced and this has necessitated the use of more fuel in the incinerators to remove a greater proportion of the hydrocarbons and more efficient filters and/or scrubbers.

EP-A-0 050 795 discloses an installation for recovering metal from scrap which installation comprises a furnace having a bath chamber and a dry hearth chamber, an exhaust duct communicating with the bath chamber and an incinerator for burning fumes from the dry hearth chamber.

In this arrangement heat from the bath chamber is transferred to the dry hearth chamber by conduction through a wall between the bath chamber and the dry hearth chamber and by conduction through the molten metal. Fumes from the dry hearth chamber are transferred to a burner firing into the bath chamber. The exhaust gasses are then vented through an exhaust duct.

Whilst this arrangement represents an improvement on the prior art insofar as the heat of combustion of the hydrocarbons is used to heat the furnace the arrangement is still relatively inefficient.

The object of at least preferred embodiments of the present invention is to reduce the volume of fuel needed for the entire reclamation process, the total volume of gas emitted to the atmosphere and the total size of the installation.

According to the present invention there is provided an installation for recovering metal from scrap which installation comprises a furnace having a bath chamber and a dry hearth chamber, an exhaust duct, and an incinerator for burning fumes from said dry hearth chamber, characterized in that said installation further comprises a source of oxygen or oxygen enriched air, and means for conveying said oxygen or oxygen enriched air to said incinerator, wherein at least a major portion of the gases leaving said incinerator is introduced into said bath chamber, wherein a minor portion of the gasses from said bath chamber is vented through said exhaust duct and at least a major portion of the balance of said gasses is passed through said dry hearth chamber and recycled to said incinerator.

A minor portion of the gases leaving the incinerator may be vented directly to atmosphere.

Preferably however, all the gases leaving said incinerator are introduced into said bath chamber.

Advantageously, said installation includes a fan for blowing fumes from said dry hearth chamber into said incinerator.

Preferably, said fan is connected to a variable speed motor to control the flow of fumes to the incinerator. Alternatively, or in addition, a control valve may be provided to control the flow of fumes to the incinerator.

If desired, said incinerator may be extended into said bath chamber and may, if desired, comprise an integral part thereof.

Preferably, the exhaust duct is provided in said bath chamber, preferably at the downstream end thereof.

In addition to satisfying the needs of the fuel (generally natural gas (methane)), oxygen should be supplied to the installation when needed to combust with the hydrocarbons in the black acrid fumes.

Advantageously, the admission of oxygen is controlled by an oxygen sensor in the furnace or in a duct which conveys hot combustion gases from the incinerator to the furnace.

The oxygen level at the sensor is preferably maintained between 0% and 21% by volume to enable the rate of combustion to be limited and controlled.

An alternative control system includes a temperature sensor for detecting the temperature of liquid metal in said bath chamber, and means responsive to said temperature sensor for controlling the volume of oxygen admitted to said incinerator.

Preferably, the control system includes a sensor for determining the concentration of oxygen present in said bath chamber and means responsive to said sensor for controlling the volume of fuel admitted to said incinerator.

If desired, the incinerator may be the sole or main power of heat for the furnace.

Suitable sources of oxygen or oxygen enriched air include liquid oxygen and oxygen enriched air produced by adsorption. In the former case the installation should include a tank for holding liquid oxygen and a vaporizer. In the latter case, an adsorption unit using molecular sieve adsorbent may be utilized.

BRIEF DESCRIPTION OF THE DRAWINGS

For a better understanding of the present invention reference will now be made, by way of example, to the accompanying drawings, in which:

FIG. 1 is a schematic flowsheet of a prior art installation for the reclamation of aluminium;

FIG. 2 is a schematic flowsheet of one embodiment of an installation for the reclamation of aluminium in accordance with the present invention;

Referring to FIG. 1 of the drawings, there is shown a prior art installation, which is generally identified by reference numeral 1, for reclaiming aluminium from scrap aluminium typically comprising oil cans, grease containers and beer cans, most of which are painted and some of which are covered in plastic.

Figure 3:
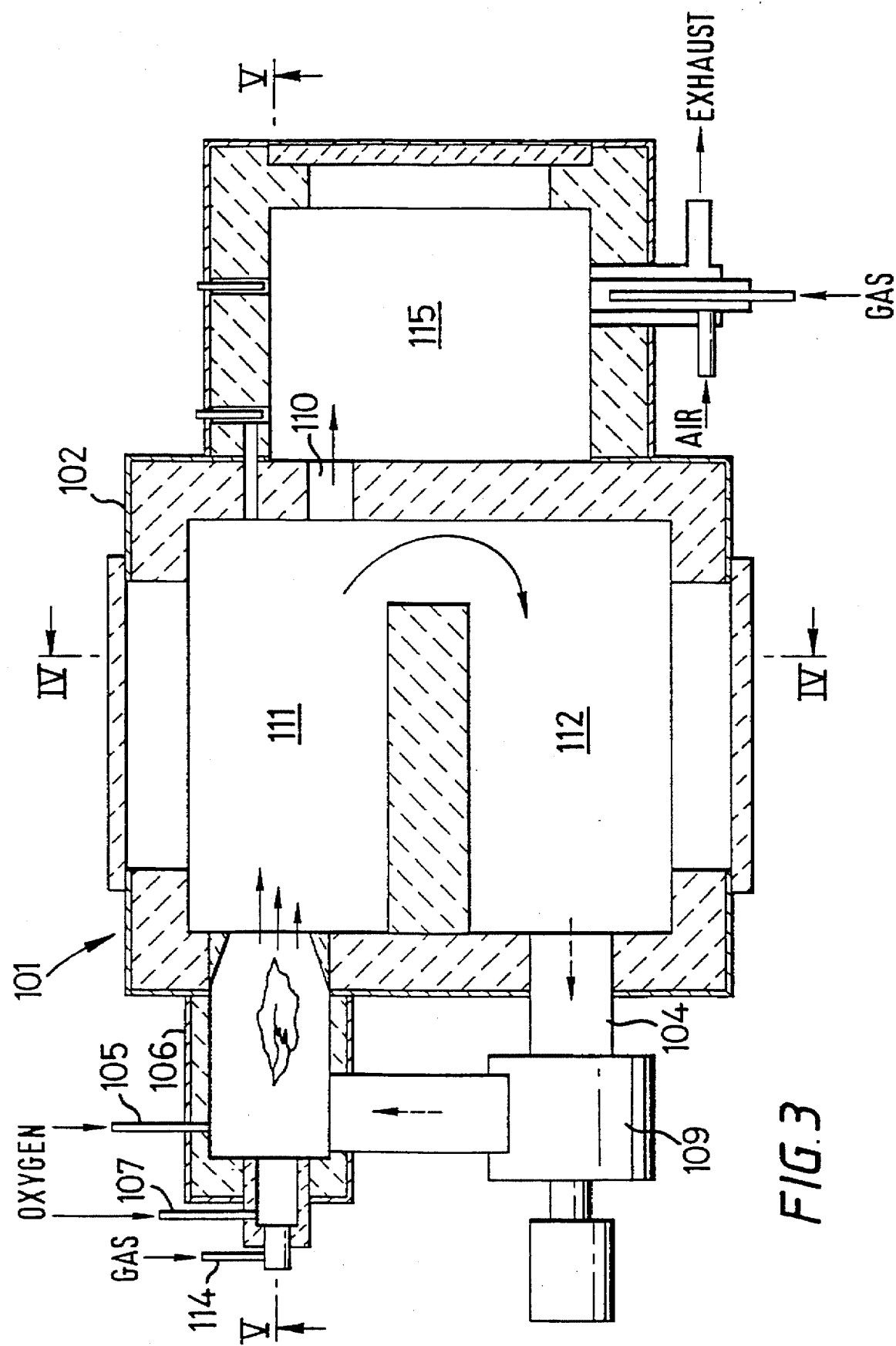
FIG. 3 is a horizontal section through the installation schematically shown in FIG. 2.

The scrap aluminium is placed in the dry hearth chamber 11 of a batch furnace 2 and is heated by hot gases emanating from a burner 3 firing into the bath chamber 12 of the furnace 2 and combusting stoichiometric proportions of air and natural gas. The heat melts the aluminium in the dry hearth chamber 11 and, at the same time, vaporizes and partially combusts the plastic, oil, grease and paint which leaves the furnace 2 through a duct 4 in the form of acrid black fumes.

Air is added to the duct 4 through pipe 5 and the gaseous mixture is passed into an incinerator 6 where it is burnt by combusting stoichiometric proportions of air and natural gas introduced through duct 7. The volume of air injected through pipe 5 is found by trial and error. Some of this air may also be admitted directly to the furnace 2 as secondary air, to control the combustion of the hearth.

In practice acrid black fumes are not given off continuously from the furnace 2 but over an extended period sometime after the start of the heating operation depending on the nature of the scrap. Because the time when the fumes will be emitted is not known precisely it is the practice to inject the maximum amount of air which will be required for combustion at any one time throughout the whole batch operation.

The incinerated gas finally leaves the incinerator 6 through duct 8 at about 850° and, after being filtered to remove particulate material, is vented to atmosphere.

For the purposes of comparison in a typical installation the burner 3 will inject over a complete batch one volume of natural gas and 9.5 volumes of air into the installation. The burner 7 will inject 0.27 volumes of natural gas and 2.6 volumes of air and 10.5 volumes of air will be injected through pipe 5. The total exhaust will thus be 23.87 volumes. Typically, 2046 KW of heat from natural gas will be required per tonne of aluminium reclaimed.

Turning now to FIG. 2, there is shown an installation in accordance with the invention. The installation, which is generally identified by reference numeral 101, comprises a furnace 102 having a dry hearth chamber 112 and a bath chamber 111. A fan 109 is arranged to convey acrid black fumes of unburnt hydrocarbons through duct 104 to an incinerator 106 which is arranged to exhaust directly into the furnace 102. An exhaust duct 110 is situated at the downstream end of the bath chamber 111.

In use stoichiometric quantities of oxygen and natural gas are fed to incinerator 106 via duct 107. The oxygen and natural gas mix with the fumes from duct 104 and additional oxygen from pipe 105. The whole burns to produce a hot, clean exhaust gas which is introduced into the bath chamber 111 of the furnace 102.

Part of the clean exhaust gas is vented to atmosphere (via a filter) through exhaust duct 110 at the downstream end of the bath chamber 111 whilst the balance passes over the scrap in the dry hearth chamber 112 of the furnace 102 melting the aluminium and vaporizing and partially combusting the unwanted plastic, oil, grease and paint which leaves the furnace 102 through duct 104 as acrid black fumes.

The arrangement described with reference to FIG. 2 has several advantages. In particular, using industrially pure oxygen as the oxidizing agent, and recycling the heat in the exhaust gases from the furnace enables a substantial reduction in the amount of fuel required compared with the installation shown in FIG. 1, without taking into account any heat contribution from combustible materials in the scrap or fume and vapours derived therefrom.

A second advantage concerns the heat generated by combustion of solid waste (e.g., rubber and plastic contaminants, vaporized oil, grease, paint and carbon smoke particles) this heat also being fed directly into the furnace 102. In the prior art this heat was either wasted or used to heat water.

In practice, according to the calorific value the amount of the combustible waste material mixed with the metal to be recycled, the supply of fuel used via duct 107 can be reduced further or even cut off for part of the cycle with the result that the overall fuel consumption can be reduced by at least 60% when compared with the installation in FIG. 1. Thus it may be advantageous to add combustible waste material to the scrap metal to achieve the absolute minimum fuel consumption.

A third advantage concerns the total volume of emissions and the concentration of impurities in the exhaust. Firstly, because the incinerator 106 is acting as the sole heat source for the installation 101 and oxygen is being used rather than air the temperature in the incinerator 106 can be relatively high (up to 3000° C.) depending on the flow of recycled fumes. Higher temperatures result in more rapid and more complete combustion of the impurities. Generally the temperature in the incinerator 106 will be between 1000° C. and 2000° C. and typically 1700° C. Secondly, because of the recycle of the black acrid fumes, the volume of exhaust gas is substantially equal to the volume of methane and oxygen introduced to the incinerator 106. This reduces the loading on the filters to nearly one eighteenth of the prior art and also reduces the size of chimney required.

Whilst it is desirable that the temperature in the incinerator 106 should be high it should be noted that he temperature of the molten metal in the bath chamber should not be raised to such an extent that an unacceptable proportion of the molten metal vaporizes.

For the purposes of comparison with the installation shown in FIG. 1, over one batch 0.4 volumes of natural gas are supplied through duct 107. This requires 0.8 volumes of oxygen for complete combustion. This in turn mixes with 7.5 volumes of hot exhaust gas from the furnace, delivered through duct 104.

To combust the fume and hydrocarbon vapours around 10% of excess oxygen is used, giving a total oxygen volume of 0.88 volumes oxygen, through pipe 105. This supply of oxygen is preferably split in two streams, one stream of oxygen through pipe 105 being introduced directly to the incinerator 106.

Thus the total volume leaving the incinerator 106 and passing to the furnace 102 equals 8.78 volumes. The volume exhausted from the system, via exhaust duct 110, must equal the volume of fuel and oxygen added to the system, i.e., 1.28 volumes, measured at NTP.

Thus the comparison between the two systems as depicted in FIGS. 1 and 2, indicate exhaust volumes in the ratio of 1.28 to 23.87, i.e., the exhaust volume is typically only 5.4% of the exhaust from a conventional system.

The typical fuel consumption of the new system is around 818 KW per tonne of aluminium reclaimed, before taking into consideration the heat energy available in the combustible materials and vaporized hydrocarbons present in the scrap metal.

Figure 4:
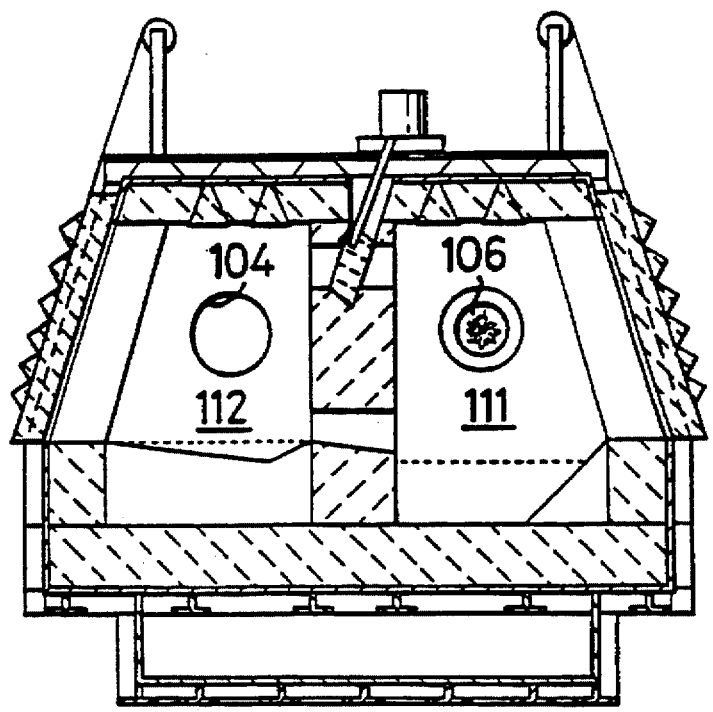
FIG. 4 is a view taken on line IV—IV of FIG. 3.
Figure 5:
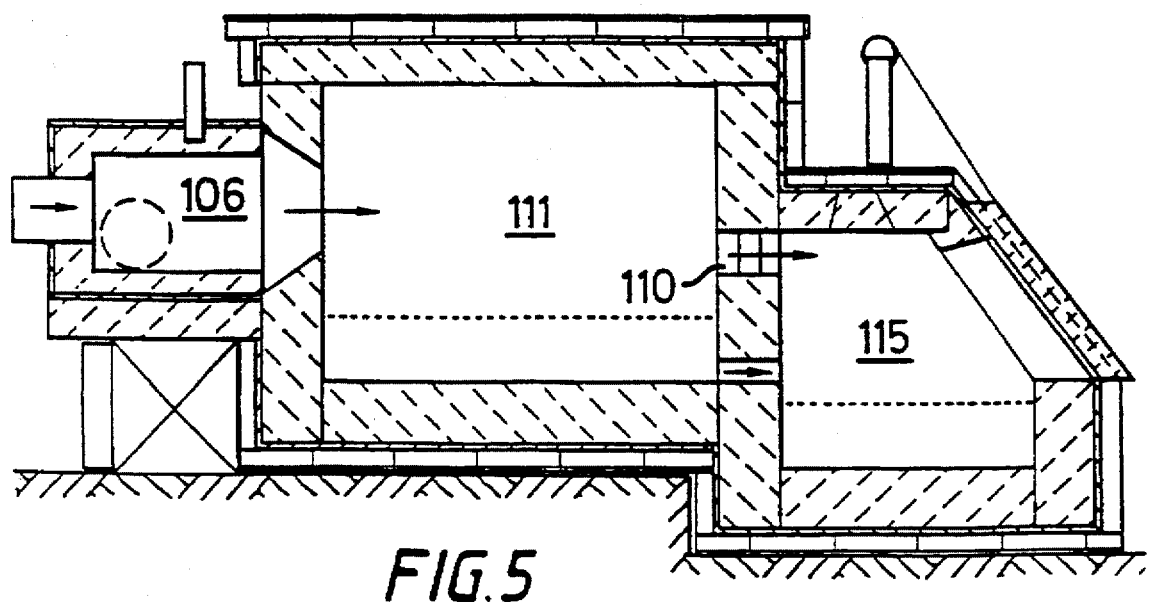
FIG. 5 is a view taken on line V—V of FIG. 3.

Referring now to FIGS. 3, 4 and 5, the installation 101 comprises a furnace 102 which comprises a bath chamber 111 and a dry hearth chamber 112.

In use, scrap aluminium is loaded into the dry hearth chamber 112. Fan 109 is started to purge the installation 101. Natural gas is then introduced through pipe 114 and combusts in incinerator 106 with the oxygen present in the air. Oxygen is then introduced through pipe 107 in stoichiometric proportion to the natural gas. The hot exhaust at about 1700° C. from the incinerator 106 passes through the bath chamber 111 where it initially heats the refractory lining and a small portion is exhausted to atmosphere via exhaust duct 110 and holding furnace 115. The balance passes through the dry hearth chamber 112 where it heats the scrap aluminium. The hot gas then passes through duct 104 and is returned to the incinerator 106 by fan 109. Additional oxygen is introduced through pipe 105 in accordance with a predetermined programme. This oxygen is introduced to react with combustible material in the scrap. A monitor in bath chamber 111 monitors the oxygen content.

After some time the plastic, grease, oil and paint on the scrap aluminium start vaporizing and partially combusting. These form acrid black fumes which pass through duct 104 and are fully combusted in incinerator 106, with the oxygen supplied through pipe 105.

As the aluminium in the dry hearth chamber becomes molten it flows into a bath chamber 111 where it is heated to about 800° C. The aluminium oxide present floats to the surface and can be skimmed off as dross. The aluminium itself is drained off into the holding furnace 115 as and when required.

It will be appreciated that since the bath chamber 111 contains little or no material responsible for producing acrid black fumes the exhaust duct 110 can be disposed at the end of the bath chamber 111 between the bath chamber 111 and the dry hearth chamber 112. This utilises the heat in the exhaust gas as much as possible and maximises the time during which any unburnt impurities in the gas can be oxidized.

Figure 6:
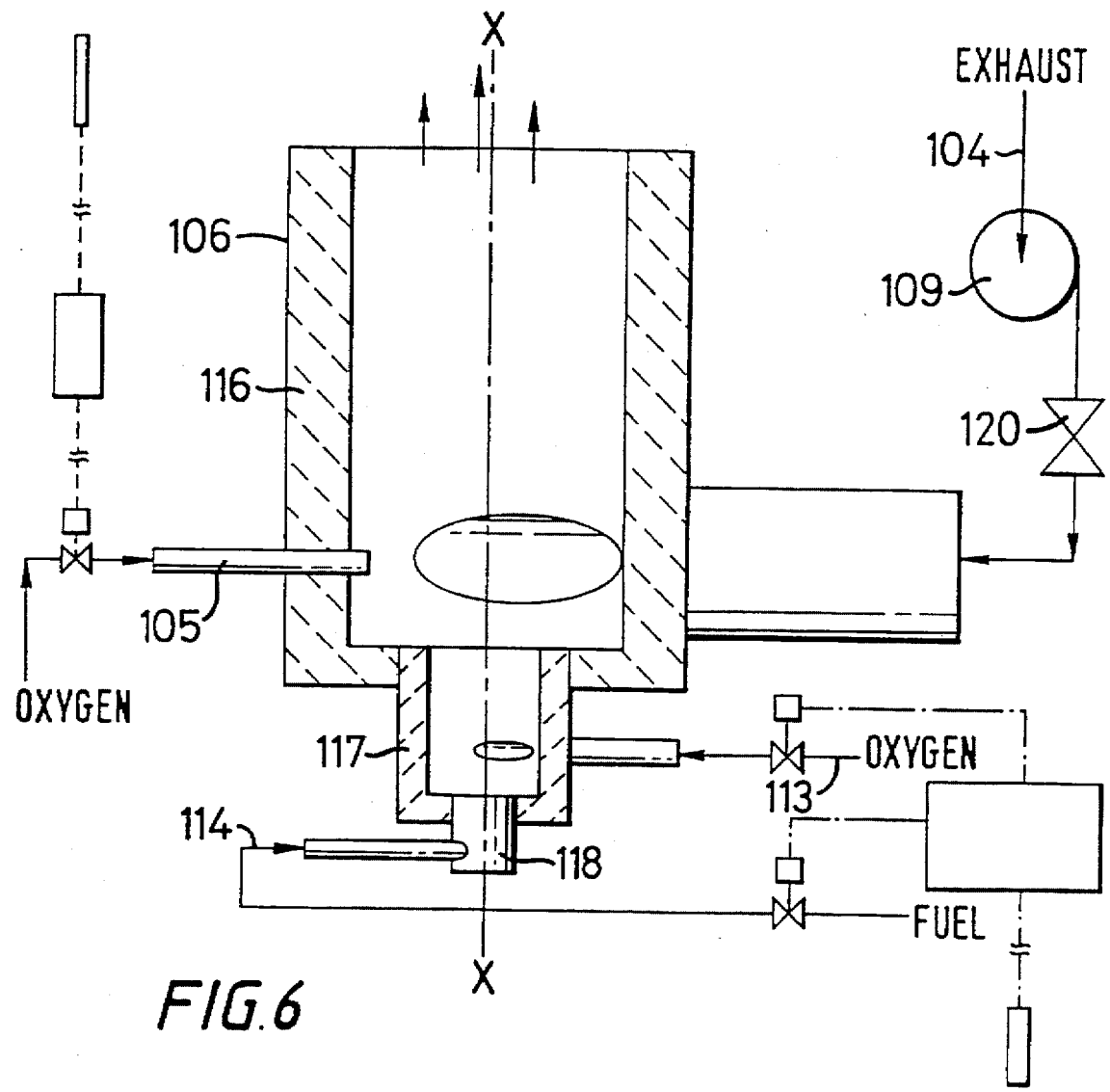
FIG. 6 is a cross-sectional view, on an enlarged scale, of the incinerator shown in FIG. 3.
Figure 7:
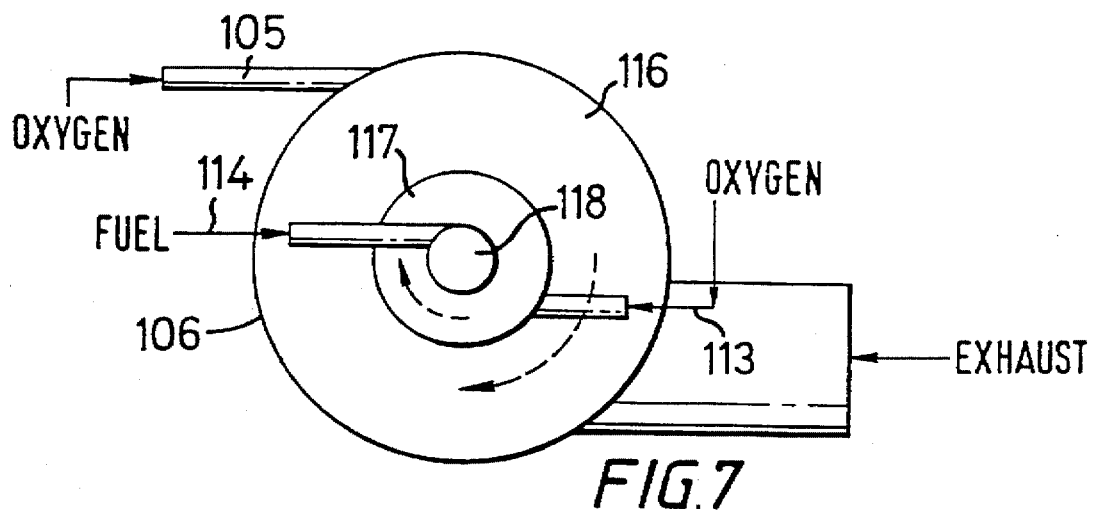
FIG. 7 is an end view of the incinerator of FIG. 6.

Referring now to FIGS. 6 and 7, the incinerator 106 comprises cylinders 116, 117 and 118 which are concentrically disposed around an axis X-X. As shown in FIG. 7, natural gas (methane) is introduced tangentially into cylinder 118 and oxygen is introduced tangentially into cylinder 117. The natural gas and oxygen mix and pass into cylinder 116 where they mix with fumes from the duct 104 and oxygen from pipe 105 (if any). The mixture thus formed combusts inside the incinerator 106 providing a supply of hot (1700°), clean exhaust gas to the furnace 102.

If desired, the proportion of the gas recycled may be adjusted by a valve 120 in the duct 104.

Alternatively, or in addition, the proportion of the gas recycled may be varied by an invertor controlling its electric drive monitor, in turn controlled by a programmable logic controller (not shown) controlling the system.

By varying the proportion of gas recycled the temperature of the hot exhaust from the incinerator 106 can be adjusted between 1000° C. at high recycle rates up to 3000° C. at low recycle rates to suit the type of metal to be melted. For example, for aluminium scrap, the exit gas temperature from the incinerator 106 may be as high as 1900° C. A much lower temperature may be appropriate for fine metal turnings which may easily be vaporized and thus lower the yield.

As indicated earlier the oxygen supply is preferably varied throughout the batch process. In the preferred embodiment the oxygen supply is initially fixed at twice the volume of fuel required at start up. As the temperature in the returned exhaust gases increase the amount of fuel required to maintain the temperature in the furnace is reduced. When the flow of fuel is reduced the excess oxygen then available maintains the combustion of sufficient combustible materials in the recycle flow to supply an amount of heat equivalent to the heat output of fuel reduced. The fuel supply is then further reduced to a level where equilibrium is achieved, or until such time as the combustible materials are exhausted and more fuel is required to maintain the furnace temperature.

As the oxygen supply enters the system at the incinerator 106, the combustion of fuel and fume is satisfied preferentially to combustion on the dry hearth 112.

In a more refined control system a temperature sensor is provided to sense the temperature of liquid metal in the bath chamber 111. When the temperature exceeds the desired level the flow of oxygen through pipe 107 is reduced. This reduces the level of oxygen in the bath chamber which is sensed by the monitor. The signal from the monitor is used to reduce the supply of natural gas to the incinerator 106 so a pre-programmed volume of oxygen is available after stoichiometric combustion of the fuel and the oxygen.

If the oxygen concentration sensed by the monitor is below the expected value the supply of fuel is further reduced since there is clearly an excess of combustible material present. Similarly, if the oxygen concentration sensed by the monitor is above the expected value the supply of fuel is increased.

In order to appreciate the significance of the present invention estimates for the supply of a small prior art installation were received at approximately £1M. An installation based on FIGS. 3 to 7 for the same duty should cost less than £0.35M.

I claim:

1. A process for recovering metal from scrap using a furnace having a bath chamber, a dry hearth chamber, an exhaust duct, and an incinerator for burning fumes from said dry hearth chamber, wherein said process comprises (a) conveying oxygen or oxygen enriched air to said incinerator in order to produce a desired oxygen concentration within said incinerator; (b) introducing at least a major portion of the gases leaving said incinerator into said bath chamber; (c) venting a minor portion of the gases from said bath chamber through said exhaust duct; and (d) passing at least a major portion of the balance of said gases through said dry hearth chamber and recycling said balance of said gases to said incinerator, and wherein the concentration of oxygen present in one of said furnace and a duct which conveys hot combustion gases from the incinerator to the furnace is determined, and the volume of oxygen admitted to said incinerator is controlled responsive to the concentration of oxygen determined in order to maintain said desired oxygen concentration within incinerator.

2. The process of claim 1, wherein all the gases leaving said incinerator are introduced into said bath chamber.

3. The process of claim 2, wherein said fumes are blown by a fan from said dry hearth chamber into said incinerator.

4. The process of claim 1, wherein all the balance of the gases leaving said bath chamber are passed through said dry hearth chamber.

5. The process of claim 1, wherein said exhaust duct is provided in said bath chamber.

6. The process of claim 5, wherein said exhaust duct is provided at the downstream end of said bath chamber.

7. The process of claim 1, wherein said incinerator is the sole or main source of heat for the furnace.

8. A process for recovering metal from scrap using a furnace having a bath chamber, a dry hearth chamber, an exhaust duct, and an incinerator for burning fumes from said dry hearth chamber, wherein said process comprises (a) conveying oxygen or oxygen enriched air to said incinerator in order to produce a desired oxygen concentration within said incinerator; (b) introducing at least a major portion of the gases leaving said incinerator into said bath chamber; (c) venting a minor portion of the gases from said bath chamber through said exhaust duct; and (d) passing at least a major portion of the balance of said gases through said dry hearth chamber and recycling said balance of said gases to said incinerator, and wherein the temperature of liquid metal in said bath chamber is detected, and the volume of oxygen admitted to said incinerator is controlled responsive to the temperature detected in order to maintain said desired oxygen concentration within said incinerator.

9. The process of claim 8, wherein the concentration of oxygen present in said bath chamber is determined and the volume of fuel admitted to said incinerator is controlled responsive to said concentration of oxygen determined.

10. The process of claim 8, wherein all the gases leaving said incinerator are introduced into said bath chamber.

11. The process of claim 10, wherein said fumes are blown by a fan from said dry hearth chamber into said incinerator.

12. The process of claim 8, wherein all the balance of the gases leaving said bath chamber are passed through said dry hearth chamber.

13. The process of claim 8, wherein said exhaust duct is provided in said bath chamber.

14. The process of claim 13, wherein said exhaust duct is provided at the downstream end of said bath chamber.

15. The process of claim 8, wherein said incinerator is the sole or main source of heat for the furnace.

* * * * *